United States Patent [19]

Culp et al.

[11] 4,326,102
[45] Apr. 20, 1982

[54] AUDIO DATA TRANSMISSION DEVICE WITH COUPLING DEVICE

[75] Inventors: David W. Culp, Huntington Beach; Dale P. Mastell, El Toro, both of Calif.

[73] Assignee: MSI Data Corporation, Costa Mesa, Calif.

[21] Appl. No.: 118,394

[22] Filed: Feb. 4, 1980

[51] Int. Cl.³ .................................. H04M 11/00
[52] U.S. Cl. .................................. 179/2 C; 179/1 C
[58] Field of Search ........... 179/1 C, 2 C, 2 A, 2 CA, 179/2 DP; 340/365 E

[56] References Cited

U.S. PATENT DOCUMENTS

| | | | |
|---|---|---|---|
| 2,987,575 | 6/1961 | Chalfin | 179/1 C |
| 3,614,326 | 10/1971 | Cameron | 179/2 A |
| 3,663,757 | 5/1972 | Cassidy | 179/2 DP |
| 3,719,783 | 3/1973 | Kennedy | 179/1 C |
| 3,808,369 | 4/1974 | Libby | 179/1 C |
| 3,887,771 | 6/1975 | Spanel | 179/1 C |
| 3,920,926 | 11/1975 | Lenaerts et al. | 179/2 CA X |
| 3,938,090 | 2/1976 | Borison et al. | 179/2 CA X |
| 3,976,840 | 8/1976 | Cleveland et al. | 179/2 C X |
| 3,992,583 | 11/1976 | Davis et al. | 179/2 C X |
| 4,007,443 | 2/1977 | Bromberg et al. | 340/365 E X |
| 4,158,106 | 6/1979 | Mason | 179/2 C |
| 4,268,721 | 5/1981 | Nielson et al. | 179/2 C |

OTHER PUBLICATIONS

IBM Technical Disclosure Bulletin—vol. 10, No. 3, Aug. 1967, p. 188-189.

Primary Examiner—Aristotelis M. Psitos
Attorney, Agent, or Firm—Edward J. DaRin

[57] ABSTRACT

An audio data transmission device for transmitting binary coded audio tones over a telephone system. The audio data transmission device is adapted to be utilized with a hand-held, data collection terminal provided with a speaker emitting binary coded audio tones. The transmission device consists of a muff for receiving the microphone portion of a conventional telephone handpiece and a solid transmission element. The transmission element is adapted to be mechanically connected to the housing for the terminal for channeling the data tones to the telephone handset without dampening. The transmission element is defined to be mechanically tuned to the characteristics of the telephone microphone to minimize the generation of second harmonics of the desired audio tones.

2 Claims, 10 Drawing Figures

U.S. Patent  Apr. 20, 1982  Sheet 1 of 3  4,326,102
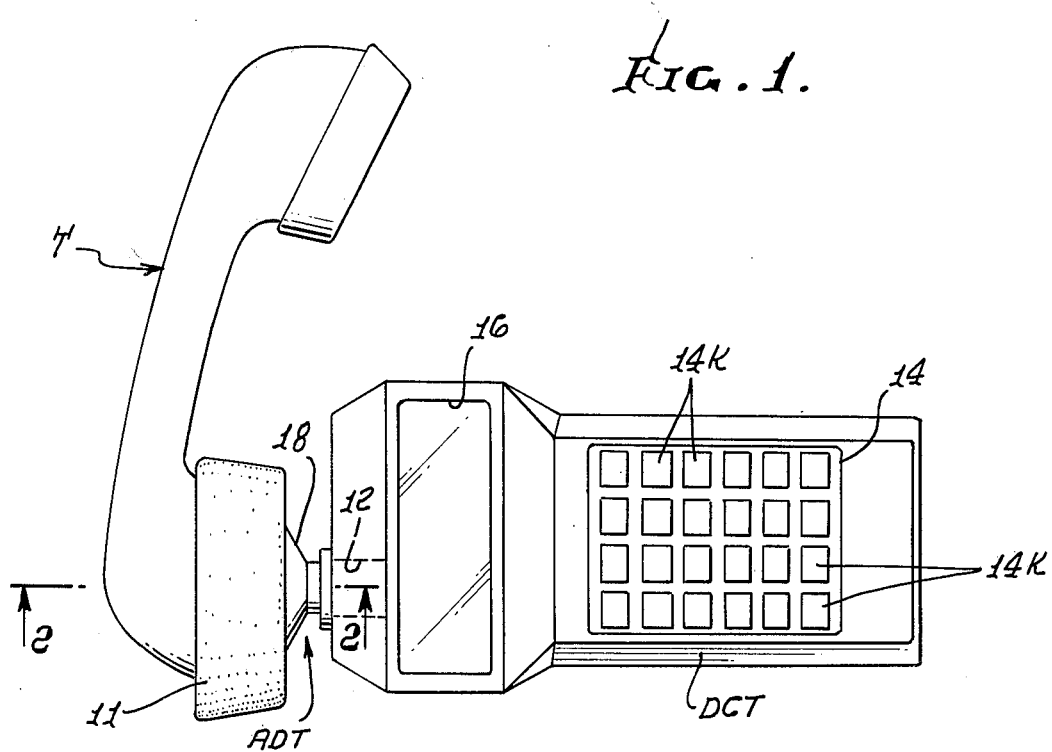
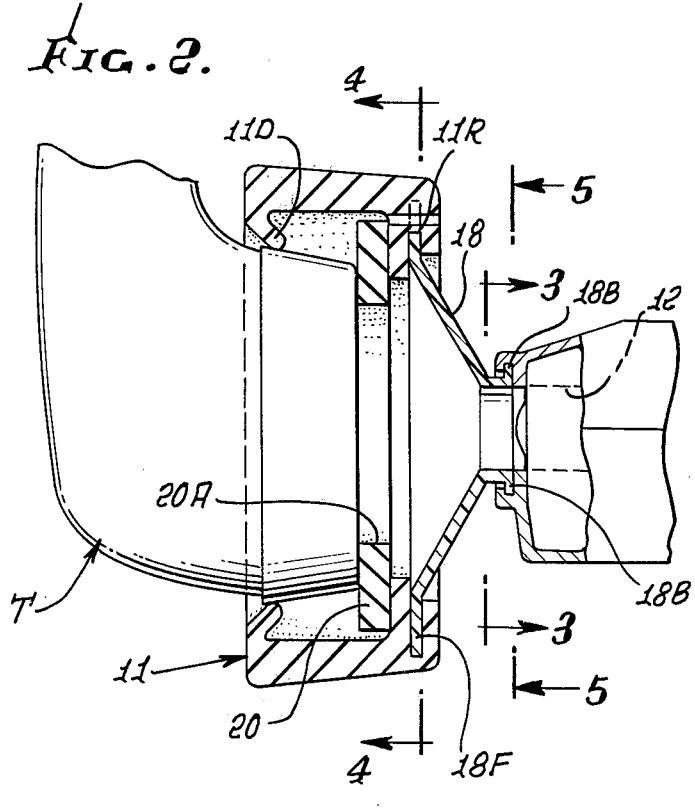
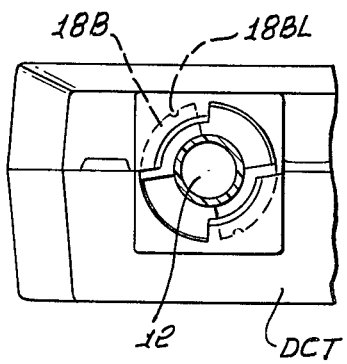

AUDIO DATA TRANSMISSION DEVICE WITH COUPLING DEVICE

This invention relates to an audio data transmission device, and more particularly, to a mechanical coupling device for transmitting audio data tones to a conventional telephone handpiece.

Hand-held, battery operated, data collection terminals are well known in the art. These data collection terminals are used in various applications such as ordering of goods, inventory control, or the like. The data to be collected may be manually entered into the terminal by means of a keyboard and/or optical scanning wands. The data collection terminals have been conventionally constructed with means for detecting keying errors, improper entry of data, and the like, and generating internal error signals in response to any such error. For the purpose of audibly signalling an error to the data collection terminal operator, an audible tone is generated by means of a speaker constructed within the terminal housing to call attention to the operator of the error. These data collection terminals presently include solid state memories therein for storing the data entered into the terminal as binary coded signals. The collected, stored data is transmitted to a remote point for further processing by means of a conventional telephone handset and telephone lines. For this purpose, the data stored in the memory of the data collection terminal is read out of the memory in the form of binary coded electrical signals and applied to an acoustic coupler. Conventional acoustic couplers are constructed and defined to receive a telephone handset therein when removed from its telephone cradle for receiving and transmitting the electrical signals and converting them to binary coded audio tones. For this purpose the acoustic couplers include an integral speaker functioning as a transducer to convert the binary coded electrical signals to corresponding audio tones. The audio tones are binary coded by assigning different audio frequencies to represent the binary 0's and the binary 1's. The speaker for such acoustic couplers is mounted within the coupler to be closely spaced to the telephone handpiece when mounted therein to cause the acoustic tones to directly impinge on the telephone mouthpiece in the manner an individual speaks into the mouthpiece. The sound level of the acoustic tones transmitted by the telephone transducer is adjusted electrically in the data collection terminal. The frequencies of the audio tones that are conventionally transmitted for this purpose are signals of 1200 Hertz and 2100 Hertz to represent the different binary coded characters. An example of a prior art type of system employing such an acoustic coupler is disclosed in U.S. Pat. No. 3,576,433. Conventional acoustic couplers are fairly bulky and require a substantial flat surface for mounting in order to conveniently place the telephone handpiece in the coupler. Also, connectors and cables must be strung between the source of electrical signals, such as the data collection terminal and the acoustic coupler. The type of data collection terminals under consideration are conventionally employed in telephone booths after the data collection operation is completed for transmitting the data collected during the day to a remote point for processing by a computer. Telephone booths, as is well known, have a limited amount of space, including shelf space, for manipulating an acoustic coupler, and conventional acoustic couplers are difficult to employ in such phone booths because of the limited shelf space available.

The present invention provides an improved and relatively inexpensive audio data transmission device that is used for mechanically transmitting and channeling audio data tones received from an audio data source to be directly coupled to the mouthpiece of a conventional telephone handset. The mechanical transmitting and channelling device is acoustically tuned to the characteristics of the telephone transducer to minimize the well known tendency of the telephone transducer to generate second harmonics which would result in incorrect interpretation of the data tones at the remote receiving end, and thereby cause erroneous data to be processed. The improved audio data transmission device of the present invention has been constructed and defined for use with an improved data collection terminal wherein a single speaker is employed for both generating error tones to signal the operator that an erroneous data entry process has occurred, and generating the audible data tones within the data collection terminal to transmit and channel the audio tones to a telephone mouthpiece by means of the novel transmission device. The dual use of the speaker results in a significant reduction in the cost of the manufacture of data collection terminals and eliminates the need for connectors, cables, and the speaker in an acoustic coupler, while still rendering the product more reliable. The audio data transmission device of the present invention is also advantageously constructed and defined with a mechanical coupling means for simply and reliably mechanically coacting with a coupling for the transmission device to the data collection terminal about the speaker port so as to require a minimum amount of skill to effect the coupling, yet the coupled devices can be easily handled with one hand. When the data collection terminal and the data transmission device are mechanically coupled together, the telephone handpiece can be readily mounted to the connected devices in absence of substantial shelf space, such as is found in a telephone booth and held in position by one hand. The design of the mechanical coupling means allows it to be manufactured integrally with the housing for the terminal and with the audio data transmission device, and preferably out of a plastic material, with minimum tooling costs. This is true even when the mechanical coupling device is selected to be a bayonet connector.

From a broad apparatus standpoint, the present invention comprehends means for providing binary coded acoustic signals. A housing for enclosing the source of the acoustic signals wherein the housing includes a sound transmitting channel arranged adjacent the acoustic signal means for transmitting the acoustic signals outside of the housing. The housing is further defined with mechanical coupling means integral with the housing at the sound transmitting channel for receiving and securing a mechanical sound transmitting device to the housing around the sound transmitting channel. The mechanical coupling means may be integrally constructed and defined with the housing in the form of a bayonet connector.

The concept of this invention may be integrated into a method of collecting data and transmitting the collected data to a remote point and when it is so combined the method of collecting data includes the steps of providing a hand-held data collection terminal having means for storing the data in a binary coded form and means for reading out the stored binary coded data and for converting the binary coded data to binary coded acoustic tones all within the data collection terminal. The data can be entered into the data collection terminal in a conventional fashion so that upon completion of the data collection steps an audio tone transmitting element can be mechanically coupled to the terminal to receive and transmit the audio tones generated in the terminal. The audio transmitting element secures an acoustic telephone muff. The steps include mounting the telephone muff over the microphone end of a conventional telephone handpiece in an acoustic sealing relationship, and then transmitting the binary coded audio tones from the data collection terminal by means of the coupled transmitting element to the telephone handset and, in turn, to a remote point, by means of the telephone lines.

The audio data transmission device of the present invention adapted for coupling audio tone signals to a conventional telephone handpiece microphone comprises a telephone handpiece muff having two open ends, with one end adapted to be slipped over the microphone end of a telephone handpiece in an acoustic sealing relationship therewith. An audio tone signal transmitting element having two open ends has one end mounted to the other open end of the telephone muff and having an inside diameter of substantially the same size as the microphone portion of the telephone handpiece, and is arranged coaxially therewith for causing the audio signals to impinge thereon. The opposite end of the transmitting element has an inside diameter of substantially the same size as the diameter of an audio sound source, so as to be mounted coaxially therewith for receiving the audio signals to be transmitted by said element. The audio tone signal transmitting element is constructed of a rigid material with the length of the signal transmitting element being selected to permit the transmission of the audio signals from the audio sound source to the microphone of the telephone handpiece without dampening, and defined to minimize the tendency for the telephone microphone to generate second harmonics of the audio signals impinging on the microphone. The signal transmitting element may include mechanical coupling means adjacent one end for connecting the transmitting element to the housing for the speaker, functioning as the source of the audio tone signals, to be coupled in a secured relationship therewith.

These and other features of the present invention may be more fully appreciated when considered in the light of the following specification and drawings, in which:

FIG. 1 is a representation of a hand-held data collection terminal having the audio data transmission device mechanically coupled thereto and with the muff for the audio data transmission device mounted on a telephone handpiece;

FIG. 2 is a partial cross-sectional view taken along the line 2—2 of FIG. 1;

FIG. 3 is a sectional view taken along the line 3—3 of FIG. 2;

Figure 9:
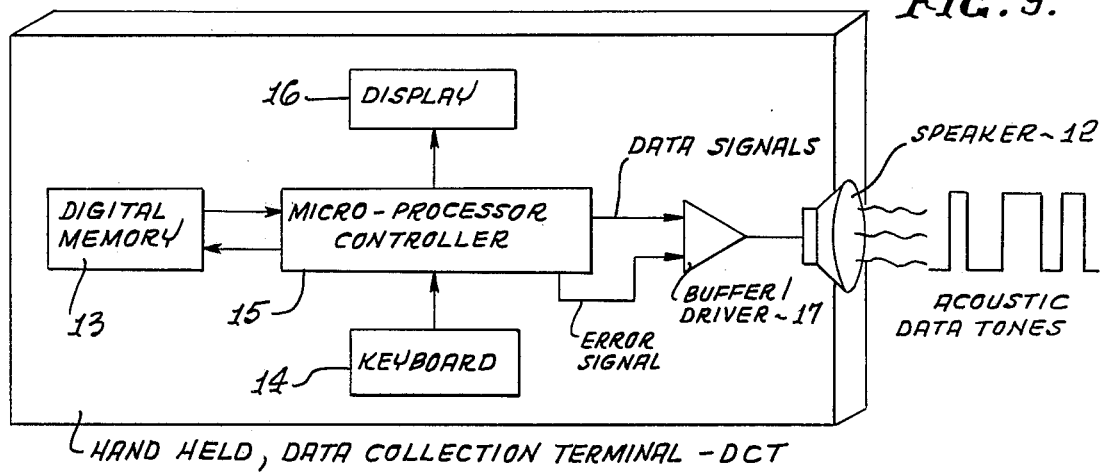
Figure 10:
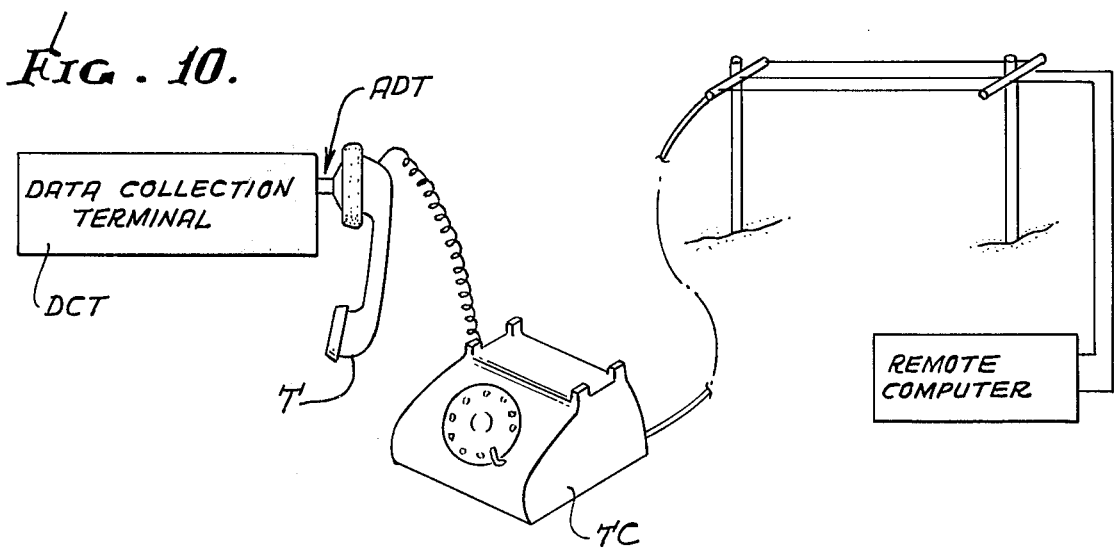

FIG. 9 is a diagrammatic, block diagram of the basic electronic elements of a conventional hand-held data collection terminal illustrating the systems arrangement for providing acoustic pulses for the speaker within the housing for the data collection terminal; and FIG. 10 is a schematic representation of a data collection terminal connected to a telephone handpiece illustrating the method of transmitting the audio data tones over telephone lines to a remote computer.

Figure 8:
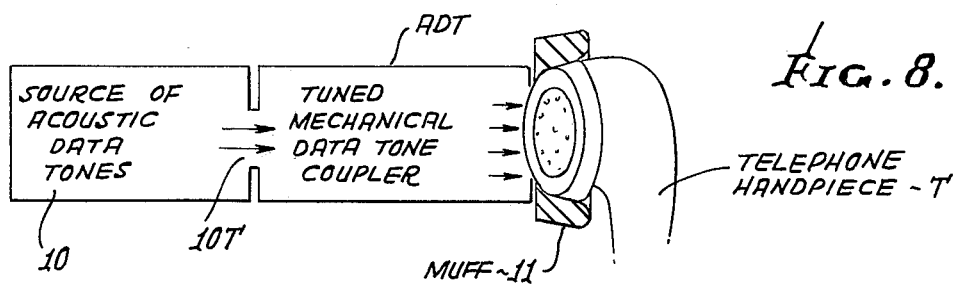
FIG. 8 is a diagrammatic representation of the basic concept of the tuned, mechanical data tone coupler arranged with the telephone handpiece, as illustrated in FIG. 1.

Now referring to the drawings, the audio data transmission device ADT comprehending the present invention will be described in detail. The audio data transmission device ADT will be described in conjunction with a more or less conventional hand-held data collection terminal DCT. From a broad standpoint, the hand-held data collection terminal DCT can be considered as the source of the acoustic data tones to be transmitted to a telephone handpiece T, as illustrated in FIG. 8. The audio data tone transmission device ADT is further characterized as a tuned, mechanical data tone coupler. In FIG. 8, the source of acoustic data tones is illustrated by means of a block 10 having a transmission channel 10T at one end thereof. The audio transmission device ADT is mechanically connected to the source of data tones 10 at the channel 10T, as diagrammatically illustrated. The audio tones are transmitted through the device ADT to the microphone (not shown) of a conventional telephone handpiece T. The audio data transmission device ADT includes a muff 11 adapted to be mounted on one end of the telephone handpiece T for providing acoustic isolation to the handpiece T with respect to the environmental sounds.

As is well known in the art, the audio data tones that are normally transmitted over telephone lines for transmitting binary coded data are transmitted at the frequencies of 1200 Hertz and 2100 Hertz for representing the binary 1's and binary 0's. It is also well known in the art that the telephone handpiece T is nonlinear and has a tendency to create second harmonics of the audio signals impinging thereon. It will be apparent that if the second harmonic of the 1200 Hertz signal is generated by the telephone handpiece that, at a remote point, the second harmonic may be detected as a 2100 Hertz, and thereby provide erroneous data. Accordingly, the audio data transmission device ADT is tuned so that the integrity of the pressure wave of the acoustic tones that is coupled thereto is maintained within the device ADT. The tuning also involves the spacing between the telephone handpiece T and the source of data tones 10, and which spacing is controlled to minimize any tendency for the data tones to generate second harmonics of a substantial amplitude at the telephone microphone to thereby minimize the possibility of being detected at the receiving end of the telephone system; see FIG. 10.

The invention will be described for use with a more or less conventional hand-held data collection terminal DCT. The hand-held data collection terminal DCT is of conventional construction, except that in this instance the speaker 12 normally arranged in a conventional acoustic coupler for transmitting acoustic data tones to a telephone handset is integrated into the data collection terminal DCT, as illustrated in FIGS. 1 and 9. In a conventional data collection terminal the speaker is not used for converting the stored data to acoustic tones. The speaker 12 that is incorporated within the data collection terminal DCT is utilized in combination with the electronic circuitry for signalling that a keying error, or the like, has been generated, and that erroneous data is being entered into the memory 13 of the data collection terminal DCT. In the data collection terminal DCT constructed in accordance with the present invention such a speaker, per se, is eliminated. The speaker 12 included within the data collection terminal DCT for the purpose of the present invention serves a dual function, namely, as the transducer for providing the error tones to signal to the terminal operator that a keying error, or the like, has been generated and, also, the same speaker 12 is utilized for providing acoustic data tones to be transmitted to the telephone handpiece T, as is illustrated in FIGS. 1 and 2. For the purposes of describing the electronics presently included in a data collection terminal, the terminal DCT is illustrated in FIG. 9 as including a digital memory 13 for storing the information that may be entered into the terminal by means of the keyboard 14. The keyboard 14 and the digital memory 13 are under the control of a microprocessor 15 which provides the necessary control signals for reading and writing into the digital memory, and also to control the information displayed on the display element 16 on the face of the terminal DCT. The keyboard 14 is of a conventional construction and is arranged with a multiplicity of keys 14K arranged in rows and columns for representing the alpha-numeric information to be entered into the terminal and stored in the digital memory 13. The data signals that are read out of the digital memory 13 are coupled to the speaker 12 by means of a buffer/driver 17. The output of the buffer/driver 17 couples the electrical binary coded signals to the speaker 12, which converts the electrical signals into the desired acoustic tones, or pulses, to be transmitted over the telephone handpiece T. The buffer/driver 17 is also shown as coupled for receiving the error signal for generating the error tones by means of the speaker 12. In this arrangement it will be noted that the audio data transmission device ADT does not include a speaker, as in a conventional acoustic coupler, but that the speaker 12 serves this function. Also, in a conventional acoustic coupler, the signals that are coupled to the speaker within the coupler have their volume controlled by means of an electrical network within the data collection terminal proper and thereby the amplitude of the resulting audio tones. This is not true with respect to the data collection system utilizing the audio data transmission device ADT of the present invention.

The hand-held data collection terminal DCT of the present invention is further modified so that the speaker 12 is arranged adjacent one wall of the housing for the terminal DCT, and which wall has a transmission channel for permitting the audio tones to propagate outside of the data collection terminal DCT. In addition, surrounding the audio transmission channel for the housing of the data collection terminal there is provided a preselected type of mechanical coupling element for mechanically securing the audio data transmission device ADT thereto, as illustrated in FIG. 1, as will be described more fully hereinafter. The audio data transmission device ADT includes an audio data transmission element 18 integrally arranged with a soft resilient muff 11 for mounting the device ADT on the microphone end of a telephone handpiece T for a conventional telephone cradle TC.

Figure 4:
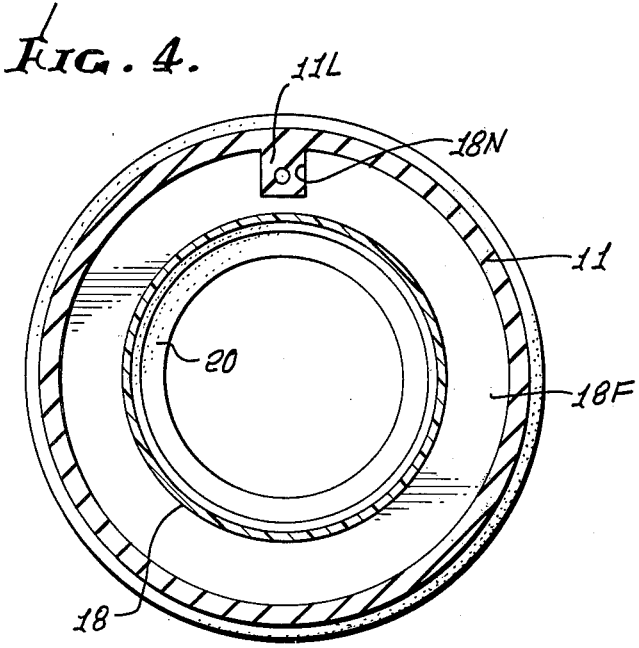
FIG. 4 is a sectional view taken along the line 4—4 of FIG. 2.

The audio data transmission device ADT has its muff 11 constructed in a more or less conventional fashion with two open ends. The muff 11 has a depth substantially similar to that of the microphone portion of the telephone handpiece T to receive the microphone end of the handpiece T therein, as best illustrated in FIG. 2. The muff 11 may include a dependent, angularly inclined element 11D arranged adjacent the outer periphery of the telephone handpiece receiving end of the muff 11. The dependent element 11D for the muff 11 is arranged to engage the outer end of the telephone handpiece T to seal it off from the internal cavity for receiving the handpiece to prevent the loss of audio energy within the muff, and also to seal off the environmental noises from interfering with the desired transmission of the audio tones into the telephone handpiece. The opposite end of the muff 11 mounts the data transmission element 18. The muff 11 mounts the element 18 by means of an internal recess 11R. To this end the element 18 has a flange 18F at the audio output end thereof adapted to be received and mounted in the recess 11R of the muff 11, so as to function as one unit. The flange 18F for the element 18 is provided with a locking notch 18N for receiving a dependent locking element 11L constructed integrally with the muff 11; see FIG. 4. With the flange 18F of the transmitting element 18 secured to the muff 11 with the notch 18N and element 11L interlocked, the element 18 cannot be rotated with respect to the muff proper and functions as a single element. The muff 11 is preferably constructed of a soft rubber material that allows it to readily accept and be positioned around the telephone handpiece T. The element 18 is constructed preferably of a rigid sound transmitting material that minimizes any loss of sound pressure in traveling between the sound source and the telephone receiver. The audio output end of the audio data transmission element 18 has a diameter substantially the same as the diameter of the adjacent sound receiving end of the muff 11. The opposite end of the element 18 is tapered to accomodate the diameter of the data transmission channel from the source of tones, such as the channel provided in the data collection terminal DCT illustrated in FIG. 2.

The audio output of the muff 11 is provided with an acoustic seal 20 sealed within the telephone receiving cavity of the muff 11 to the muff by an adhesive, or the like, for resiliently receiving the end of the telephone handpiece T in an acoustic sealing relationship therewith. The seal 20 has a central aperture 20A that is of substantially the same diameter as the microphone portion of the telephone handpiece for directly coupling the data tones emitted from the end of the element 18 to the handpiece T; see FIG. 2. The seal is preferably constructed of a resilient material. It has been found that with the use of the acoustic seal 20 the integrity of the audio tones transmitted from the source of data tones, or the data collection terminal DCT, is maintained without loss of pressure and results in improved data transmission.

Figure 5:
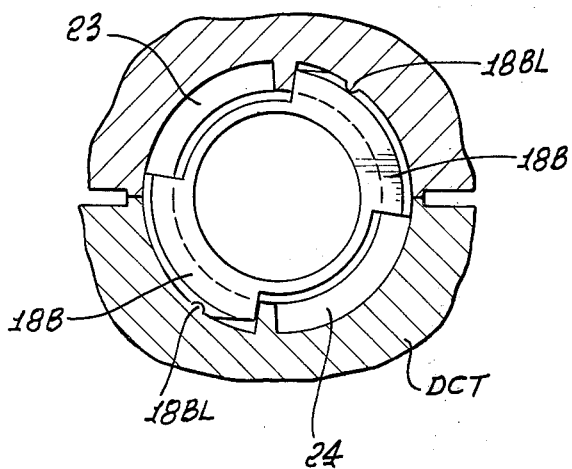
FIG. 5 is a sectional view taken along the line 5—5 of FIG. 2.

In accordance with one of the features of the present invention, the audio tone receiving end of the data transmission element 18 is provided with prongs or bayonets 18B provided on the peripheral edge of the element for mechanically coupling the element 18 to the source of data tones, or the data collection terminal DCT. The prongs or bayonets 18B can best be appreciated by examining FIG. 2 wherein a pair of bayonets are illustrated at diametrically opposed locations at the sound receiving end of the data transmission element 18. The illustrated pair of prongs 18B extend radially outwardly from the end plane of the element 18. The bayonets 18B include a locking detent 18BL arranged on each of the bayonets adjacent one end thereof, as is evident from examining FIG. 5, to secure the element 18 in a mechanically locked position. The bayonets 18B are adapted to facilitate quick attachment to the coacting female slots defined on the outer wall of the data collection terminal DCT, and to be secured thereto. The female end of the coupling element for the data collection terminal DCT can be best appreciated by examining FIGS. 3 and 5. The female portion of the bayonet coupling that is defined on the terminal DCT has the partition elements 23 and 24 defined on the front face thereof as ears, having the bayonet receiving slots defined behind same. The elements 23 and 24 are arranged diametrically opposite one another for receiving the bayonets 18B. The slots for receiving the bayonets, or prongs 18B, are defined behind ears 23 and 24 so that the element 18 can be rotated to move behind and beyond the ears 23 and 24 until the locking detent 18BL secures the cone in a mechanically locked position with a coacting protrusion defined on the face of the housing of the terminal DCT. With this arrangement, it should be appreciated that the audio data transmission device ADT can be readily attached to the terminal housing when it is desired to transmit audio data over the telephone. The device ADT can be coupled to the terminal DCT by positioning the bayonets 18B into the slots behind elements 23 and 24 and then rotated until they are locked or detented by the elements 18BL to assume the secured position illustrated in FIG. 5. This connection can be easily made by the terminal operator. Once the operator is in the vicinity of a telephone, the telephone handpiece T can be removed from its cradle TC and the microphone portion of the telephone handpiece T can be mounted within the muff 11. This assumes that the element ADT and the terminal DCT have been previously mechanically coupled together. With this arrangement, one hand can be utilized to hold the terminal DCT and thereby the coupled transmission device ADT and the telephone handset to initiate the transmission of data over the telephone and allow this operation to take place in a minimum amount of time and space.

In the implementation of the invention, it should be appreciated that the speaker 12 within the data collection terminal DCT is preferably of a very small construction. One such transducer that has been found useful for this purpose is a microphone manufactured by Ercona Corporation, of Bellmore, New York. The ceramic microphone that is commercially available from the Ercona Corporation is a condensor microphone that is utilized as a speaker within the data collection terminal DCT. The element 18 at its sound receiving end, then, is defined so that it has a diameter substantially the same as the diameter of the opening in the terminal receiving the speaker 12 so as to completely surround the audio data transmission channel for transmitting the audio data tones from the speaker 12 to the telephone mouthpiece T when connected together as described.

Figure 6:
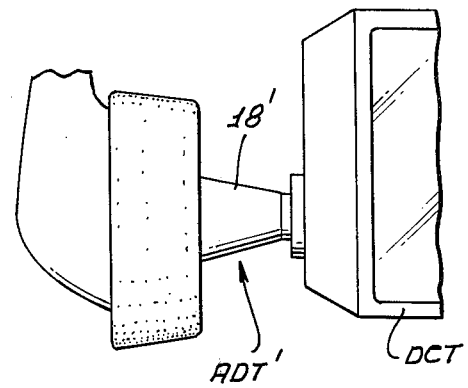
FIG. 6 is a representation of an audio data transmission device connected to a data collection device having a transmission element that is elongated from the element illustrated in FIGS. 1 and 2.
Figure 7:
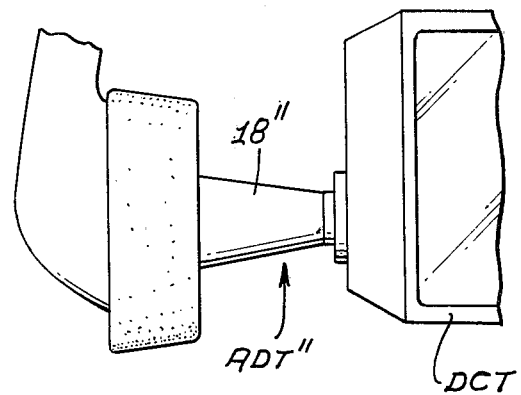
FIG. 7 is a representation of an audio data transmission device connected to a data collection terminal illustrating an elongated data channeling element from that illustrated in FIG. 6.

One practical embodiment utilizes an Ercona microphone having a diameter on the order of 0.748 inches. The element 18 is constructed of a rigid material, and preferably of a plastic material. The cone is defined to maintain the sound pressure level of the tones received from the microphone 12 and to minimize any interference within the cone of the audio tones transmitted thereto, so as to not unnecessarily cause the telephone microphone to respond erroneously and generate signals such as the second harmonics that are not desired. To this end the cone 18 functions to channel the sound waves from the microphone 12 to the telephone handpiece T. The sound, then, is captured within the cone 18 and maintained in an acoustic sealed relationship with regard to the telephone handpiece T by means of the acoustic seal 20 and is isolated from environmental noises by means of the muff 11. In one practical embodiment with local telephone configurations conventionally employed, the acoustic data transmission device ADT that has been successfully operated which minimized second harmonics provided a separation on the order of 0.97 inches from one end of the element 18 to the receiving end of the telephone handpiece T. Other configurations for the element 18 have also been defined so as to optimize the distance traveled within the element 18 relative to the transmission characteristics of various telephones. FIGS. 6 and 7 illustrate audio transmission elements ADT' and ADT" which are longer than the 0.97 element. These longer elements may be acceptable for use with telephones having different mechanical properties. The range for the elements 18 may be approximately 0.97 to 2.13 inches.

It will, of course, be appreciated that, with the audio data transmission device ADT connected to the telephone handpiece T, and the data collection terminal DCT as illustrated in FIG. 10, the telephone handpiece T converts the audio tones to electrical signals and, through the cradle TC, are transmitted over the telephone lines to a remote computer for reception and further processing as is now conventional.

What is claimed is:

1. An audio data transmission device for coupling audio tone signals to a conventional telephone handpiece microphone comprising a telephone handpiece muff comprising a cup-like configuration having two open ends, one end adapted to be slipped over the microphone end of the telephone handpiece and having an inside diameter to receive the handpiece microphone end in an acoustic sealing relationship, the opposite end of the muff having an internal flange spaced a distance from said one end to receive the telephone handpiece so as to completely enclose the microphone portion of the handpiece, said one end including a dependent, inwardly extending sealing element adapted to hug the telephone handpiece in an acoustic sealing relationship, said internal flange having a soft, acoustical sealing element secured thereto for acoustically sealing the microphone end of the handset when mounted in the muff, and an audio tone signal transmitting element having two open ends with one end secured to said internal flange of the muff and having an inner diameter substantially the same as the diameter of the sound receiving portion of the telephone microphone, said audio tone signal transmitting element having a preselected length for transmitting audio signals therein and selected to minimize the tendency of the telephone microphone to generate second harmonics in response to the audio signals transmitted thereto.

2. An audio data transmission device for coupling audio tone signals to a conventional telephone handpiece microphone comprising a telephone handpiece muff comprising a cup-like configuration having two open ends, one end adapted to be slipped over the microphone end of the telephone handpiece and having an inside diameter to receive the handpiece microphone end in an acoustic sealing relationship, the opposite end of the muff having an internal flange spaced a distance from said one end to receive the telephone handpiece so as to completely enclose the microphone portion of the handpiece, said one end including a dependent, inwardly extending sealing element adapted to hug the telephone handpiece in an acoustic sealing relationship, said internal flange having a soft, acoustical sealing element secured thereto for acoustically sealing the microphone end of the handset when mounted in the muff, and an audio tone signal transmitting element having two open ends with one end mounted to the other open end of the telephone muff and having an inside diameter of substantially the same size as the microphone portion of the telephone handpiece and arranged coaxially therewith for causing the audio signals to impinge thereon, the opposite end of the transmitting element having an inside diameter of substantially the same size as the diameter of the audio sound source so as to be mounted coaxially therewith for receiving the audio signals to be transmitted by said element, the audio tone signal transmitting element being constructed of a rigid material, the length of the signal transmitting element being selected to permit the transmission of the audio signals from the audio sound source to the microphone of the telephone handpiece without dampening and defined to minimize the tendency for the generation of second harmonics of the audio signals impinging on the microphone by the microphone.

* * * * *